United States Patent [19]
Taniguchi

[11] Patent Number: 5,122,980
[45] Date of Patent: Jun. 16, 1992

[54] ENCODER INTERPOLATOR CIRCUIT

[75] Inventor: Mitsuyuki Taniguchi, Yamanashi, Japan

[73] Assignee: Fanuc Ltd, Minamitsuru, Japan

[21] Appl. No.: 465,138

[22] PCT Filed: Jun. 16, 1989

[86] PCT No.: PCT/JP89/00607
§ 371 Date: Feb. 23, 1990
§ 102(e) Date: Feb. 23, 1990

[87] PCT Pub. No.: WO89/12798
PCT Pub. Date: Dec. 28, 1989

[30] Foreign Application Priority Data
Jun. 24, 1988 [JP] Japan .................. 63-156302

[51] Int. Cl.⁵ .............................. G06F 7/38
[52] U.S. Cl. .................................. 364/723
[58] Field of Search ........... 364/723, 724.1, 729

[56] References Cited
U.S. PATENT DOCUMENTS

| | | | |
|---|---|---|---|
| 4,718,030 | 1/1988 | Tsutsumi | 364/723 X |
| 4,788,528 | 11/1988 | Elmquist | 364/723 X |
| 4,815,354 | 3/1989 | Kunimoto | 364/723 X |
| 4,972,080 | 11/1990 | Taniguchi | 250/231.16 |

FOREIGN PATENT DOCUMENTS 62-110113 5/1987 Japan .

Primary Examiner—Tan V. Mai
Attorney, Agent, or Firm—Staas & Halsey

[57] ABSTRACT 2M-bit position data is divided into lower-order M-bit data and higher-order M-bit data. The lower-order M-bit data is stored in a lower-order storage area (14a) of a read only memory (ROM) (14), the higher-order M-bit data is stored in a higher-order storage area (14b) of the ROM. The lower-order and higher-order items of M-bit data are read out of the lower-order storage area (14a) and higher-order storage area (14b) by making the most significant bit of address data "0" and "1" successively by way of an address changing unit (15). These items of data are combined by a combining unit (17) to obtain 2M-bit position data.

3 Claims, 3 Drawing Sheets

ENCODER INTERPOLATOR CIRCUIT

BACKGROUND OF THE INVENTION

This invention relates to a coder interpolator circuit which outputs movable element position data by using an A-phase signal and a B-phase signal.

An absolute position encoder is available which is capable of detecting, as absolute position, the rotational position of a rotary shaft of a motor or the like for driving a machine tool, etc.

FIG. 3 is a block diagram of the interpolator circuit of a prior art absolute position encoder. An A-phase/B-phase signal generating unit 1 is formed by a rotary coding disk, a stationary coding disk, a light-emitting element, a light-receiving element and a signal output circuit, none of which are shown. The signal generating unit outputs sinusoidal and cosinusoidal A-phase and B-phase signals having predetermined cycles per revolution. AD converters 2 and 3 subject the A- and B-phase signals, respectively, to an analog -to- digital conversion (AD conversion) to obtain address information in the form of a set of the AD converter output data. Angle data (position data) $D_4$ conforming to the A- and B-phase signal levels is read out of the storage area of a ROM 4 designated by the address information.

Though the foregoing is described with regard to one channel, an arrangement can be adopted in which a plurality of channels having different numbers of cycles of the A- and B-phase signals are provided. A predetermined number of items of angle information are interpolated in one wavelength of each channel, and the absolute position of a movable element is detected by using the interpolated data on each channel. An absolute position encoder adapted to detect the angle information by using a plurality of channels having different numbers of cycles has already been filed for patent as International Serial No. PCT/JP89/00506.

If the resolution of the AD converters is, say, eight bits, then, when an A-phase signal $K \cdot \sin\theta$ and a B-phase signal $K \cdot \sin\theta$ are subjected to an AD conversion, a resolution in which the result of calculation with regard to the angle $\theta$ is 10 bits can be expected.

However, the ROM used in the conventional encoder is one in which the output is composed of eight bits; hence, angle data composed of more than eight bits cannot be delivered as an output. If a ROM having an output of 16 bits is used, the expected angle data can be outputted and highly precise position detection is possible. However, the configuration in such case is larger in size and has a greater number of signal lines and therefore cannot be employed in an absolute position encoder which requires a reduced size.

SUMMARY OF THE INVENTION

Accordingly, an object of the present invention is to provide an encoder interpolator circuit in which, even if a ROM having an M-bit output is used, data consisting of a maximum of $M \cdot 2^m$ bits data can be outputted in equivalent terms.

2M-bit position data is divided into lower-order M-bit data and higher-order M-bit data. The lower-order M-bit data is stored in a lower-order storage area of a ROM, and the higher-order M-bit data is stored in a higher-order storage area of the ROM. The lower-order and higher-order items of M-bit data are read out of the lower-order storage area and higher-order storage area by making the most significant bit of address data "0" and "1" successively. These items of data are combined to obtain 2M-bit position data.

Description Of The Preferred Embodiment

Figure 1:
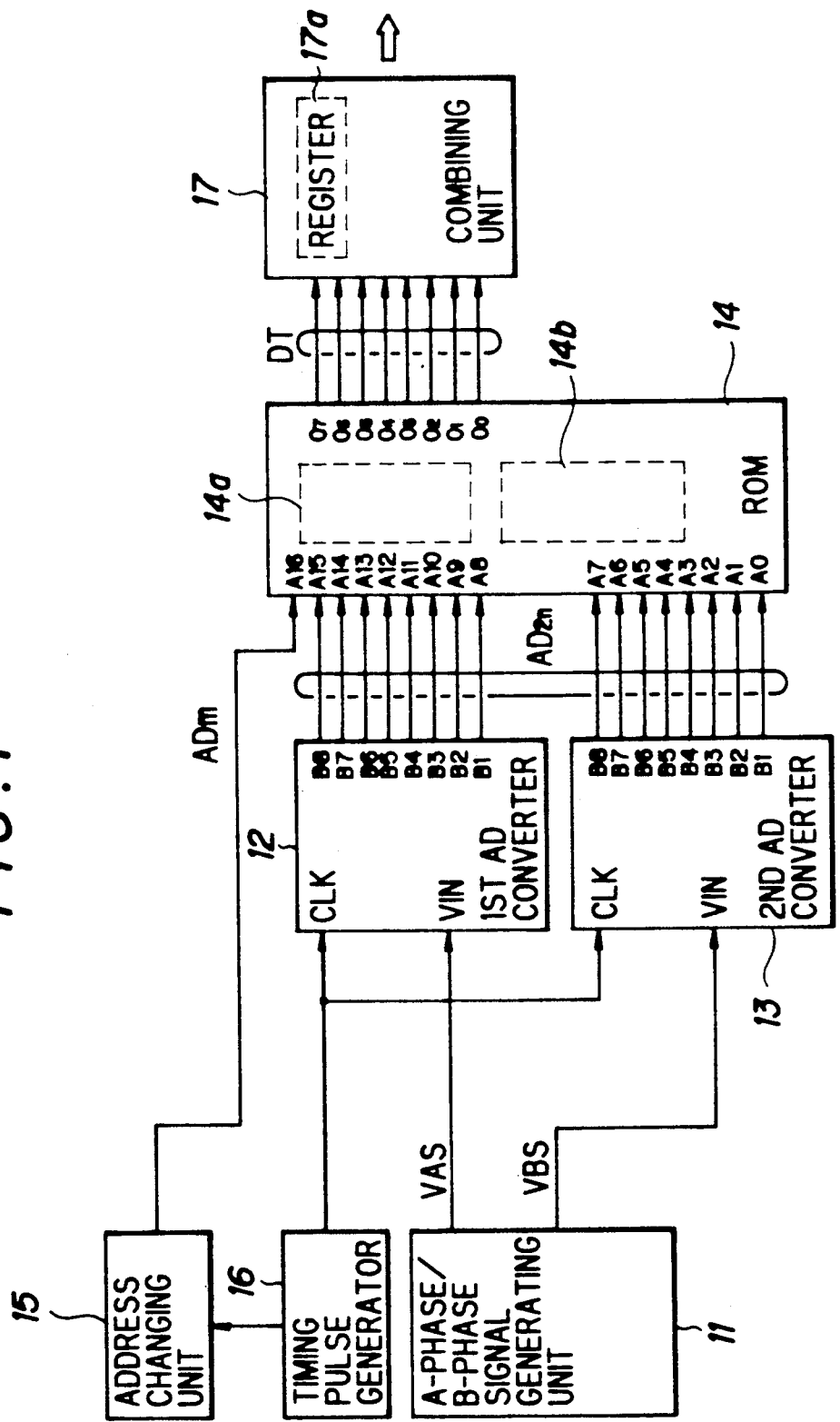
FIG. 1 is a block diagram of an interpolator circuit according to the present invention.

FIG. 1 is a block diagram of an interpolator circuit in an encoder according to the present invention.

Numeral 11 denotes an A-phase/B-phase signal generating unit, which is formed by a rotary coding disk, a stationary coding disk, a light-emitting element, a light-receiving element and a signal output circuit (none of which are shown), for outputting a sinusoidal and cosinusoidal A-phase signal VAS and B-phase signal VBS. Numerals 12 and 13 denote AD converters having an n-bit (eight bits in FIG. 1) resolution for subjecting the A-phase and B-phase signals VAS and VBS, respectively, to an analog-digital conversion. Numeral 14 designates a ROM having (2n+m)-number of address terminals and M-number of output terminals for storing angle data conforming the A-phase and B-phase signals. In actuality, the ROM 14 has 2n (n=16) address terminals $A_0$–$A_{15}$, an m(m=1) address terminal $A_{16}$ to which address data ADm is inputted, and output terminals $O_0$–$O_7$ for M (M=8) bits. Lower-order eight-bit data of the 2·M (M=16)-bit data is stored in the lower-order storage area 14a for which the address data ADm is "0", and higher-order eight-bit data is stored in the higher-order storage area 14b for which the address data ADm is "1". Accordingly, by making the address data ADm, which is applied to the address terminal $A_{16}$, "0", "1" successively, two items of eight-bit data each are read out of the ROM 14 and data consisting of a total of 2·M (M=16) bits can be obtained by combining these two items of eight-bit data.

Numeral 15 denotes an address changing unit for modifying the address data ADm which enters the m(m=1) bit address terminal $A_{16}$ of the ROM 14. Numeral 16 designates a timing pulse generating unit for generating a clock signal indicating the timing of AD conversion performed by the AD converters 12 and 13, and the timing of address data modification performed by the address changing unit 16. Numeral 17 represents a combining unit for outputting 16-bit angle data upon combining the higher-order eight bit data and lower-order eight-bit data outputted by the ROM 14.

Figure 2:
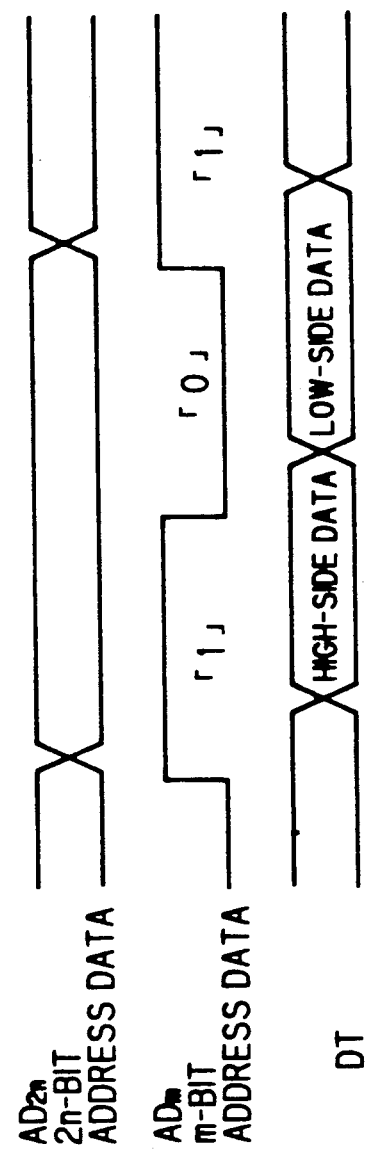
FIG. 2 is an operating time chart according to the present invention.
Figure 3:
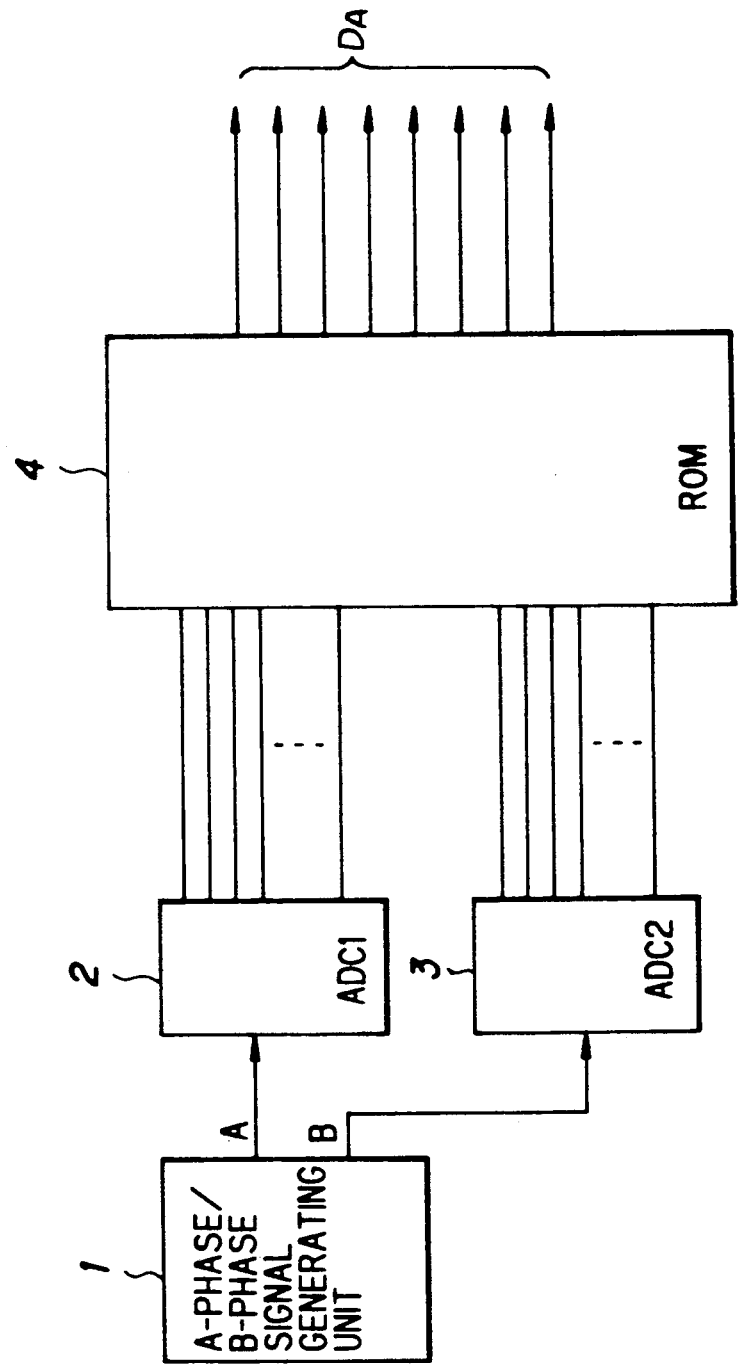
FIG. 3 is a block diagram of a conventional interpolator circuit.

FIG. 2 is a timing chart for describing the operation of the present invention. AD2n denotes address data of 2n (=16) bits applied to the address terminals $A_0$–$A_{15}$ of ROM 14, ADm address data of m (=1) bit applied to the terminal $A_{16}$ of ROM 14, and DT data of M (=8) bits outputted by the ROM 14.

The overall operation of the present invention will now be described in accordance with FIGS. 1 and 2.

The first and second AD converters 12 and 13, respectively, subject the A-phase signal VAS and B-phase signal VBS outputted by the A-phase/B-phase signal generating unit 11 to an AD conversion in synchronism with a clock CLK outputted by the timing pulse generating unit 16. Digital data consisting of a total of 2n (=16) bits outputted by the AD converters enters the 2n-number of address terminals $A_0$–$A_{15}$ of the ROM 14 as address data AD2n. The address changing unit 15 also inputs "1" address data ADm to the address terminal $A_{16}$ of the ROM 14 in synchronism with the clock pulse.

As a result, eight-bit higher-order data DT is read from the output terminals $O_0$–$O_7$ of ROM 14 and inputted to the combining unit 17, where the data is stored in a register 17a.

Thereafter, the address changing unit makes the address data ADm "0" at a predetermined timing and applies this data to the address terminal $A_{16}$ of the ROM 14. As a result, eight-bit lower-order data DT is read from the output terminals $O_0$–$O_7$ of ROM 14 and inputted to the combining unit 17.

The combining unit 17 combines the higher-order eight-bit data inputted at the first timing instant and the lower-order eight-bit data inputted at the next timing instant and outputs, to the next stage, position data consisting of a total of 16 bits.

Though the present invention has been described in detail based on an embodiment thereof, the invention is not limited to this embodiment but can be modified in various ways within the scope of the claims. For example, though the invention has been described for a case where $m=1$, m can be 2 or more, in which case position data having a maximum of $2^m \cdot M$ bits would be produced.

In accordance with the present invention as described above, digital data consisting of a total of 2n bits obtained by subjecting A- and B-phase signals to an analog-digital conversion is inputted as address data to 2n-number of address terminals of a ROM, and items of M-bit data successively outputted by the ROM by changing m-bit address data inputted to the remaining address terminals of the ROM are combined to produce position data. As a result, even if a ROM having an M-bit output is used, data consisting of a maximum of $M \cdot 2^m$ bits data can be outputted in equivalent terms.

I claim:

1. An interpolator circuit of an encoder for outputting position data of a movable element by using an A-phase signal and a B-phase signal, comprising:
    a ROM having address terminals of $(2n+m)$ bits and output terminals of M bits, m, n and M being integers greater than or equal to one, position data conforming to levels of the A-phase signal and the B-phase signal being stored in the ROM upon being divided into M bits;
    A/D converters, operatively connected to said ROM, having a resolution of n bits for subjecting the A-phase signal and B-phase signal to an analog-digital conversion and inputting, to 2n-number of lower-order address terminals of the ROM, digital output data consisting of a total of 2n bits obtained by said conversion;
    an address changing unit, operatively connected to said ROM, for changing address data of m-number of higher-order bits input to said address terminals of said ROM; and
    a combining unit, operatively connected to said ROM, for combining M bits of data successively outputted from said output terminals of said ROM and outputting $2^m \cdot M$ bits of position data;
    the address data of the higher-order m bits being successively changed by said address changing unit, and M-bit data read from said output terminals of said ROM by this change being combined to output $2^m \cdot M$ bits of position data.

2. An interpolator circuit of an encoder according to claim 1, further comprising a timing signal generating unit, operatively connected to said A/D converters, for outputting a clock signal indicating analog-digital conversion timing and a clock signal indicating address data change timing.

3. An interpolator circuit of an encoder according to claim 1, wherein $m=1$.

* * * * *